Patented July 15, 1941

2,249,537

UNITED STATES PATENT OFFICE 2,249,537

REVERSIBLE GEL COMPOSITIONS OF POLY-VINYL ALCOHOLS AND HYDROXYBENZ-AROMATIC AMIDES AND THEIR PREPARATION

Wendell H. McDowell and William O. Kenyon, Rochester, N. Y., assignors to Eastman Kodak Company, Rochester, N. Y., a corporation of New Jersey No Drawing. Application February 12, 1940, Serial No. 318,552. In Great Britain February 14, 1939

11 Claims. (Cl. 252—316)

The invention relates to the preparation of reversible gels by treating polyvinyl alcohol with the water-soluble salt of a hydroxybenzoyl amide the hydroxy and carbonyl groups being attached to the same benzenoid ring and the reversible gels prepared therefrom.

The term "polyvinyl alcohol" as used herein is to be understood as referring to polymers in which at least 50% thereof is composed of vinyl alcohol constituent. It refers to polymers all of which is composed of vinyl alcohol units and also to polymers containing not only vinyl alcohol units but also vinyl acetate (and/or propionate and/or butyrate) units providing the vinyl alcohol units make up at least 50% of the polymer.

Ordinarily polyvinyl alcohol is a water-soluble material and does not show the properties of a gel under ordinary conditions. Therefore, polyvinyl alcohol does not usually find use where continued contact with water is involved, as it has no permanence in such a situation. One object of our invention is to treat polyvinyl alcohol with the water-soluble salt of an aromatic amide, as described herein, so as to convert the polyvinyl alcohol into a rigid gel which has thermal-reversible properties. Another object of our invention is to prepare a product from polyvinyl alcohol, having gel characteristics, so as to enable its use instead of gelatin or other like materials for the various purposes in which those materials are used. A further object of our invention is to prepare gels which, when transparent, have the property of absorbing spectral radiations below approximately 400 mu.

We have found that when polyvinyl alcohol is treated with the water-soluble salt of an aromatic amide in which a hydroxyl group is attached to the ring to which the carbonyl group of the amide is attached, the polyvinyl alcohol forms an opaque, white gel which is firm and strong. We have found that this gel is thermal reversible in that it is converted into a liquid by heating and becomes a gel again upon cooling. We have found that polyvinyl alcohol may be thus gelled whether it is of high, medium or low viscosity. The gelling agents should be used in the form of their alkali metal salts either by dissolving the salt in water and adding it to the polyvinyl alcohol, by dissolving the aromatic amide itself in dilute alkali and then incorporating the solution into an aqueous solution of the polyvinyl alcohol, or in some other manner assuring the presence of the salt, preferably at an elevated temperature. Upon standing, the polyvinyl alcohol solution cools and a gel forms. It is preferred that sufficient gelling agent be used so that a firm, rigid gel is formed at room temperature. However, if very small quantities of gelling agent are used, it may be necessary to cool below room temperature to induce gelling.

The proportion of gelling agent employed may be varied depending on the conditions present. For instance, polyvinyl alcohol has been gelled with gelling agents of the type described herein at room temperature in a proportion as low as approximately 3% (based on the weight of the polyvinyl alcohol) exclusive of the alkali present. With small proportions of gelling agent, it has been necessary to cool below room temperature to obtain a gelling effect.

In order to induce gelling within a short time, it is desirable to use a substantial proportion of gelling agent in the mass. The proportion of gelling agent, which is most desirable to use, depends on the temperature of gelling desired for the product formed, the viscosity of the polyvinyl alcohol, the concentration of the polyvinyl alcohol and the gelling agent which is used. With higher viscosity polyvinyl alcohols, the proportion of gelling agent need not be as great as with the lower viscosity polyvinyl alcohols to cause gelling within a time which would be practical. The following table illustrates the effect of amounts of gelling agent of the type under consideration. The gelling agent employed was β-naphthyl salicylamide (also known as salicylic acid-β-naphthylamide). The polyvinyl alcohol was in the form of an aqueous solution containing 5.4% thereof by weight and was heated to 50–60° C. at the time that the gelling agent dissolved in the sodium hydroxide was added thereto. The samples were allowed to stand at room temperature and the effect of the gelling agent was noted.

| Grams of polyvinyl alcohol dope | Grams gelling agent | N/2 NaOH cc. | Result |
|---|---|---|---|
| 50 | .05 | 0.65 | No gel at room temperature. |
| 50 | .10 | 1.30 | Gelled after several hours. |
| 50 | .20 | 2.60 | Satisfactory gel in few minutes. |
| 50 | .30 | 3.90 | Firm gel formed quickly. |

Other gelling agents of the type under consideration will require different amounts to give the same effect. For instance, using salicylanilide, it is necessary to employ approximately 25% or more thereof, based on the weight of the resin, to obtain good gelling at room temperature. If lesser amounts are used cooling must be used to obtain the gel. For instance, employing approximately 18% (based on the weight of the resin) of salicylanilide, it was necessary to cool the mass to 5° C. to obtain a gel. When 3-hydroxy-2-naphthoyl anilide was employed, it was found that the mass would gel at room temperature when approximately 3½% or more (based on the weight of the resin) of that gelling agent was used. Thus it may be seen that the proportions of gelling agent used may vary as some of those listed seem to have a more pronounced gelling effect than do others which are effective, but in larger quantities.

It is preferable to use an amount of gelling agent well in excess of that barely necessary to form a gel at room temperature. With the use of larger proportions of gelling agents, formation of the gel usually occurs at temperatures above room temperature such as in some cases temperatures of 30–40° C. When this occurs, the gel, when it has reached room temperature is exceptionally firm and rigid. Proportions of gelling agent above the minimums given may be used such as 50% up to 100% or even up to 200% or more. For purposes of economy the use of more than 200% in actual practice with ordinary concentrations of polyvinyl alcohol is improbable. For convenience of operation, the range of 3–7% for the concentration of polyvinyl alcohol in water is preferred for the polyvinyl alcohols usually used. These polyvinyl alcohols are ordinarily of a viscosity which gives a molecular weight of approximately 6700–19,800. With higher viscosity polyvinyl alcohols concentrations of less than 3% might be desirable, while with lower viscosity polyvinyl alcohols, a concentration of more than 7% might be employed.

The pH of the mass is not critical but it should be sufficiently alkaline so that the gelling agent is in the form of its alkali metal salt and, therefore, soluble in water which is the medium employed in the gelling operation. The mass will tolerate a considerable excess of alkali, an excess being ordinarily employed to assure good results. The use of too great an amount of alkali is, of course, wasteful and introduces the problem of effective washing after the gelling action has occured. The aromatic amides, which we have found to be effective as gelling agents, are as follows:

(1) The hydroxybenzaromatic amides, such as salicylanilide, disalicylbenzidide, β-naphthyl salicylamide, salicyl-2, 5-dichloroanilide, salicyl-o-hydroxy anilide, di(m-hydroxybenzoyl)-benzidide and di(p-hydroxybenzoyl)-benzidide and (2) the hydroxy-naphthanilides, such as 3-hydroxy-2-naphthoyl anilide, 3-hydroxy-2-naphthoyl-2-toluidide, 3-hydroxy-2-naphthoyl-4-anisidide, 3-hydroxy-2-naphthoyl-3-nitranilide, 3-hydroxy-2-naphthoyl-α-naphthalide, 3-hydroxyl-2-naphthoyl-β-naphthalide, di(3-hydroxy-2-naphthoyl) benzidide, 1-hydroxy-2-naphthoyl anilide and the meta- and para- hydroxyl-benzoyl derivatives of β-naphthylamine.

It is noted that in all of these, the hydroxyl groups should be attached to the benzenoid ring to which the carbonyl group is attached. Some of the gels obtained, using these gelling agents, are colored but in most cases a white or colorless gel is obtained. It is to be understood that it is the water-soluble salts of these compounds rather than the compounds themselves which act as the gelling agents.

The following examples illustrate the gelling of polyvinyl acohol with an aromatic amide, having the carbonyl grouping and a hydroxyl group attached to the same benzenoid ring.

Example I 2.5 grams of salicylic acid-β-naphthylamide dissolved in 32 cc. of .5N sodium hydroxide were dispersed in 500 grams of 5.4% aqueous, high viscosity, polyvinyl alcohol dope. Complete admixture was accomplished by combining the solutions at a temperature of 50° C.–60° C. Upon cooling, a rigid gel was obtained which was heat-reversible.

Example II 5 grams of salicylanilide dissolved in 40 cc. of 0.5N alkali was combined in warm solution with 250 grams of an aqueous polyvinyl alcohol solution containing 5.7% of polyvinyl alcohol by weight. Upon cooling, a gel was obtained having thermal-reversible properties, as evidenced by its conversion into liquid upon warming.

Example III 1.25 grams of di-(3-hydroxy-2-naphthoyl) benzidide was dissolved in 40 cc. of 0.5N alkali and was combined in warm solution with 250 grams of aqueous polyvinyl alcohol solution containing approximately 5.6% by weight of the polyvinyl alcohol. After thorough mixing, the mass was allowed to cool and at room temperature. A gel soon formed which was clear and colored greenish yellow.

Example IV 0.5 gram of disalicylbenzidide was dissolved in 8 cc. of 0.5N alkali and mixed with 250 grams of a warm aqueous polyvinyl alcohol solution containing 5.6% of polyvinyl alcohol. The solution was colorless and upon cooling, quickly set to a gel. Coatings made from this composition by coating out the warm solution upon a film-forming surface, then setting the coating by chilling and curing by treating with hot air, were colorless and flexible.

Example V

To prepare a colored material, using a gelling agent which ordinarily gives a colorless gel, 500 grams of a 5.4% warm aqueous polyvinyl alcohol dope were treated with 2.5 grams of salicylic acid-β-naphthylamide dissolved in 32 cc. of warm 0.5N sodium hydroxide solution. Malachite green was also incorporated, the amount used depending upon the intensity of color desired. A firm thermal-reversible gel formed upon cooling which could be used to prepare colored coatings in the manner described in the preceding example.

The gels obtained, in accordance with our invention, may be used for various purposes. For instance they may be used for photographic emulsions as the protective colloid for silver halide, as described and claimed in Lowe application Serial No. 318,559 filed of even date. When colored and in the form of sheeting, these gels may be used for safe lights or for light filters in photographic apparatus. A rather distinctive property of these gels, when transparent, either colored or uncolored, which is probably due to the type of gelling agent used, is the filtering out of spectral radiations below 400 mu. Therefore, the gels of our invention are very effective for use when in colloidized form as ultraviolet filters, particularly where it is desired that the radiations up to 400 mu be absorbed.

The other uses to which these gels may be put are subbing layers in photographic films, over-coatings or backings for photographic film, as adhesives, for sizing paper or cloth or for coating compositions. These gels, particularly after they have been coated out into sheet form, may be hardened, such as by treating with formaldehyde, bichromates, chrome alum or diketones. If desired, plasticizers may be incorporated with the gels, particularly if the formation of flexible sheeting therefrom is contemplated. Some of the plasticizers which may be employed are glycol, glycerol, or monoacetin. The sheeting may be prepared by coating out the solution on to a film-forming surface and allowing it to solidify or gel followed by drying.

As pointed out previously, gels may be prepared using either polyvinyl alcohol or polyvinyl compounds, containing a sufficient proportion of hydroxyl groups, so as to be a polyvinyl alcohol for all practical purposes. The criterion as to whether a hydrolyzed polyvinyl ester may be employed as the polyvinyl alcohol is whether or not it is soluble in water. If the polyvinyl ester containing a large proportion of hydroxyl is soluble in water, a rigid, opaque gel may be formed therefrom in accordance with our invention. It is to be noted that the gelled polyvinyl alcohol, in accordance with our invention, has advantages over natural products in that a resin of definite purity can be obtained and the treatment with the gelling agent can be standardized in contrast to natural products whose properties may vary markedly, due to the difference in different batches of the material. Therefore, the gelled polyvinyl alcohol in the various uses given lends itself to standardization in those processes.

If desired the gelling agents as described herein may be chemically incorporated into large molecular compounds and may be used in that form. For instance a resin may be synthesized containing salicylic acid-β-naphthylamide in its molecular chain which may be used in the form of its sodium salt. This type of gelling agent may be prepared by reacting a salicylic acid-formaldehyde condensation product with β-naphthylamine. The resulting resin appears to have the structure:

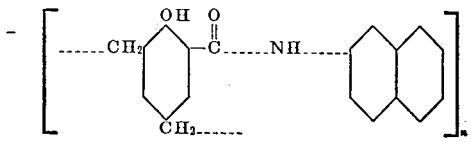

Other like compounds of large molecule which are gelling agents may be prepared by reacting a salicylic acid-aldehyde condensation product with aniline or an aliphatic amine to form a resin having a salicylamide in the resin structure. These gelling agents are used in the gelling of polyvinyl alcohol in the form of their alkali metal salts. The resinous gelling agents have the advantage that they are more resistant to diffusing than are the gelling agents of lower molecular weight. The gels are obtained in opaque form in the gelling process of our invention but give clear coatings when dried in layer form.

We claim:

1. A firm, thermal-reversible gel composed of polyvinyl alcohol mixed with a gelling amount of an alkali metal salt of an aromatic amide in which the carbonyl group of the amide is joined to a benzenoid ring to which a hydroxyl group is attached.

2. A firm, thermal-reversible gel composed of polyvinyl alcohol and a gelling amount of the sodium salt of a hydroxy benzanilide.

3. A firm, thermal-reversible gel composed of polyvinyl alcohol mixed with a gelling amount of an alkali metal salt of a hydroxy benznaphthalide.

4. A firm, thermal-reversible gel composed of polyvinyl alcohol mixed with a gelling amount of an alkali metal salt of a hydroxy naphthanilide.

5. A firm, thermal-reversible gel composed of polyvinyl alcohol and a gelling amount of the sodium salt of an ortho-hydroxy benzanilide.

6. A firm, thermal-reversible gel composed of polyvinyl alcohol mixed with a gelling amount of an alkali metal salt of an ortho-hydroxy benznaphthalide.

7. A firm, thermal-reversible gel composed of polyvinyl alcohol mixed with a gelling amount of an alkali metal salt of an ortho-hydroxy naphthanilide.

8. A method of preparing a rigid thermal-reversible gel which comprises mixing an aqueous solution of polyvinyl alcohol with a gelling amount of an alkali metal salt of an aromatic amide in which the carbonyl group of the amide is joined to a benzenoid ring to which a hydroxyl group is attached, at a temperature at which the mixture retains its liquid form, and subsequently lowering the temperature to the point at which the formation of a gel occurs.

9. A method of preparing a thermal-reversible gel which comprises mixing an aqueous solution of polyvinyl alcohol with a gelling amount of an alkali metal salt of a hydroxy benzaromatic amide, at a temperature at which the mixture retains its liquid form, and subsequently lowering the temperature to the point at which the formation of a gel occurs.

10. A method of preparing a thermal-reversible gel which comprises mixing an aqueous solution of polyvinyl alcohol with a gelling amount of an alkali metal salt of a hydroxy naphthanilide at a temperature at which the mixture retains its liquid form, and subsequently lowering the temperature to the point at which the formation of a gel occurs.

11. A method of preparing a rigid thermal-reversible gel which comprises mixing an aqueous solution of polyvinyl alcohol with a gelling amount of an alkali metal salt of an aromatic amide in which the carbonyl group of the amide is joined to a benzenoid ring at a point adjacent to which the hydroxyl group is attached, at a temperature at which the mixture retains its liquid form, and subsequently lowering the temperature to the point at which the formation of a gel occurs.

WENDELL H. McDOWELL.
WILLIAM O. KENYON.